United States Patent [19]
Dreps

[11] Patent Number: 6,072,840
[45] Date of Patent: Jun. 6, 2000

[54] HIGH SPEED DIFFERENTIAL CMOS SINE-WAVE RECEIVER WITH DUTY-CYCLE CONTROL MEANS

[75] Inventor: Daniel Mark Dreps, Georgetown, Tex.

[73] Assignee: International Business Machines Corporation, Armonk, N.Y.

[21] Appl. No.: 08/844,504

[22] Filed: Apr. 18, 1997

[51] Int. Cl.[7] .................................................. H04L 27/02
[52] U.S. Cl. .......................... 375/316; 327/321; 327/331
[58] Field of Search ........................... 375/257; 327/278, 327/321, 331; 326/86

[56] References Cited

U.S. PATENT DOCUMENTS

| | | | |
|---|---|---|---|
| 3,947,778 | 3/1976 | Hsiao et al. | 330/30 D |
| 4,004,164 | 1/1977 | Cranford, Jr. et al. | 307/297 |
| 4,622,521 | 11/1986 | Redfern | 330/9 |
| 4,713,560 | 12/1987 | Herndon | 307/455 |
| 4,721,866 | 1/1988 | Chi et al. | 326/86 |
| 5,055,902 | 10/1991 | Lambert | 357/41 |
| 5,063,311 | 11/1991 | Swapp | 327/278 |
| 5,142,495 | 8/1992 | Canepa | 365/189.09 |
| 5,283,479 | 2/1994 | Rosseel et al. | 307/446 |
| 5,506,541 | 4/1996 | Herndon | 327/541 |
| 5,581,209 | 12/1996 | McClure | 327/538 |

*Primary Examiner*—Temesghen Ghebretinsae
*Assistant Examiner*—Kevin M Burd
*Attorney, Agent, or Firm*—Sawyer & Associates; Anthony V. England

[57] ABSTRACT

A system and method for providing a high speed differential receiver circuit is disclosed. The system comprises a source device. A receiver is coupled to the source device. The receiver receives first and second differential signals at a first input and a second input and provides first and second output signals at a first output and a second output. The system also comprises a first plurality of load devices coupled to the first output. The first plurality of load devices control a first voltage swing at the first output. The system also comprises a second plurality of load devices coupled to the second output. The second plurality of load devices control a second voltage swing at the second output.

37 Claims, 3 Drawing Sheets

HIGH SPEED DIFFERENTIAL CMOS SINE-WAVE RECEIVER WITH DUTY-CYCLE CONTROL MEANS

FIELD OF THE INVENTION

The present invention relates to a method and system for a high speed receiver and more particularly to a method and system for implementing a high speed receiver having a means for controlling the duty cycle.

BACKGROUND OF THE INVENTION

In most conventional processors, a PLL located on the processor chip and an external reference clock are used to provide the processor clock. Typically, the reference clock has a frequency less than the frequency desired for the processor clock. For example, in a PCI system, the reference clock might have a frequency of either 33 megahertz ("MHz") or 66 MHz. The PLL uses the reference clock as a base and synthesizes a higher frequency signal to provide the clock for the microprocessor.

A processor using a PLL and a reference clock provides a processor clock which can be synchronous with the remainder of the system. This is because all components of the system, including the processor, can be aligned with an edge of the reference clock signal. However, a system using a PLL to synthesize the processor clock is generally susceptible to noise. For example, a PLL typically has a three sigma jitter, which is usually around 100 picoseconds.

A high speed processor clock with less jitter can be produced using a differential SAW. The SAW is located off of the processor, thereby reducing the background noise to which the clock is subject. The SAW also contains a narrow band filter which rejects noise outside of the band. Because of the narrow band filter, the SAW provides a single frequency signal. This single frequency signal is a sine wave. All harmonics and other effects seen in a noisy spectrum are thereby eliminated. As a result, less noise is fed into processor chip, thereby reducing the uncertainty in clock edge.

The differential SAW provides a first sine wave and a second sine wave 180 degrees out of phase with the first sine wave. Both sine waves have the single frequency passed by the narrow band filter inside the SAW. As discussed above, signals of other frequencies are eliminated. Although jitter is reduced, the duty cycle can be corrupted. Typically, the duty cycle will be corrupted by one of the sine waves being offset with respect to the other. If the clock is to function effectively, this offset must be corrected. In addition, it would be beneficial if the means for correcting the offset were relatively simple, requiring less circuitry.

Accordingly, what is needed is a system and method for providing a receiver which for corrects the duty cycle of a high speed differential signal. The present invention addresses such a need.

SUMMARY OF THE INVENTION

The present invention provides a method and system for providing a high speed differential receiver circuit. The system comprises a source device. A receiver means is coupled to the source device. The receiver means receives first and second differential signals at a first input and a second input and provides first and second output signals at a first output and a second output. The system also comprises a first plurality of load devices coupled to the first output. The first plurality of load devices control a first voltage swing at the first output. The system also comprises a second plurality of load devices coupled to the second output. The second plurality of load devices control a second voltage swing at the second output.

According to the system and method disclosed herein, the present invention provides a high speed differential signal having a corrected duty cycle, thereby increasing overall system performance.

DETAILED DESCRIPTION OF THE INVENTION

The present invention relates to an improvement in high speed receivers. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

In most conventional processors, an on-chip PLL and a reference clock provide the processor clock. Typically, the reference clock has a frequency less than the frequency desired for the processor clock. For example, in a system having PCI architecture, the reference clock has a frequency of either 33 MHz or 66 MHz. The PLL synthesizes a higher frequency signal to provide the clock for the microprocessor using the reference clock as a base. However, a processor using a PLL and a reference clock is generally susceptible to noise. A PLL typically has a jitter of approximately 100 picoseconds.

Using a SAW, a conventional system can produce a high speed processor clock with less jitter. Typically, the SAW is located off of the processor. The SAW has an internal, narrow band filter to reject noise outside of the band. Because of the filter, the differential SAW provides a signal having a single frequency. This signal is a first sine wave and a second sine wave 180 degrees out of phase with the first sine wave. Consequently, less noise is fed into processor chip and the uncertainty in clock edge is reduced.

Although the differential SAW produces a signal with less jitter, those of ordinary skill in the art will realize that the duty cycle can be corrupted. This can be seen in FIGS. 1a through 1c.

Figure 1A:
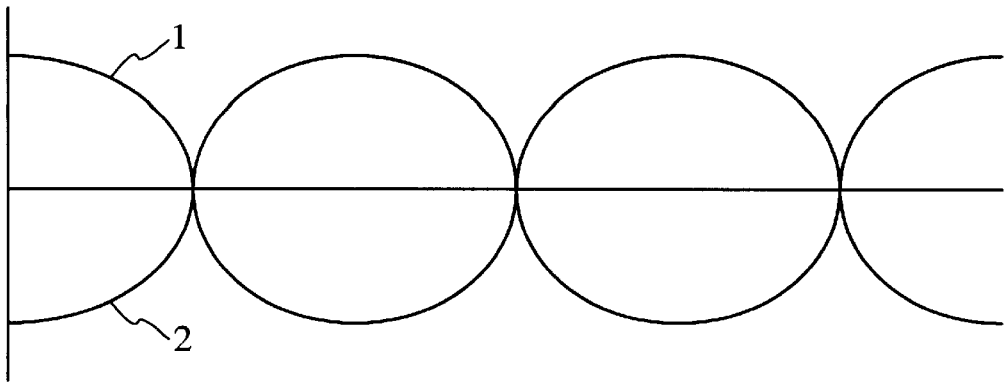
FIG. 1a is a graphic illustration of a differential signal having a correct duty cycle.
Figure 1B:
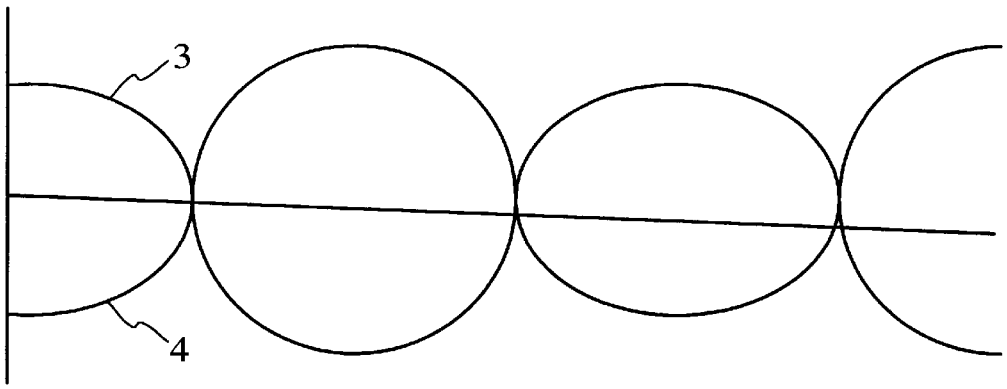
FIG. 1b is a graphic illustration of a differential signal having in which duty cycle is shifted positive.
Figure 1C:
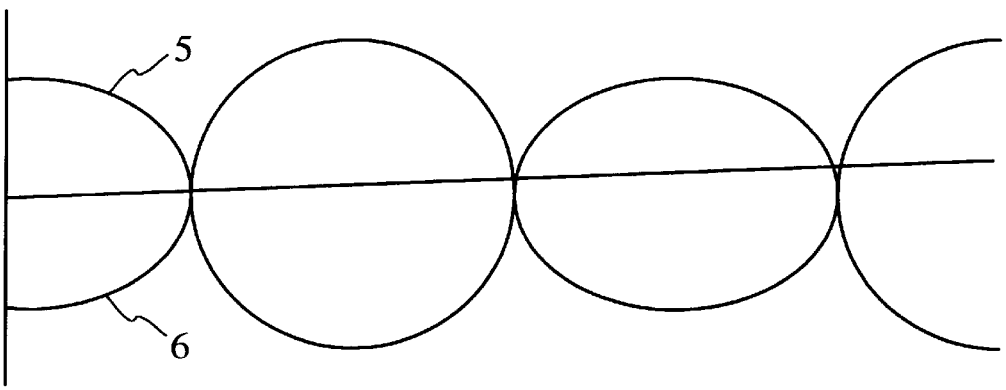
FIG. 1c is a graphic illustration of a differential signal in which the duty cycle is shifted negative.

FIG. 1a depicts a signal having a proper duty cycle. In FIG. 1a, the first sine wave 1 and the second sine wave 2 are symmetric. Typically, the duty cycle will be corrupted by one of the sine waves being offset. This is shown in FIGS. 1b and 1c. FIG. 1b displays the signal where the duty cycles is corrupted because the first sine wave 3 is shifted slightly negative with respect to the second sine wave 4. FIG. 1c displays the signal where the duty cycle is corrupted because the second sine wave 6 is shifted slightly positive with respect to the first sine wave 5.

Those of ordinary skill in the art will readily realize that if the SAW signal is to effectively function as a clock, the offsets of FIGS. 1b and 1c must be corrected. In addition, it would be beneficial if the circuit for correcting the offset were relatively simple.

The present invention provides for a method and system for receiving a high speed differential signal and correcting the duty cycle. The present invention will be described in terms of a receiver for a high speed SAW signal to provide a clock in a processor. However, one of ordinary skill in the art will readily recognize that this method and system will operate effectively for other types signals used for other functions.

Figure 2:
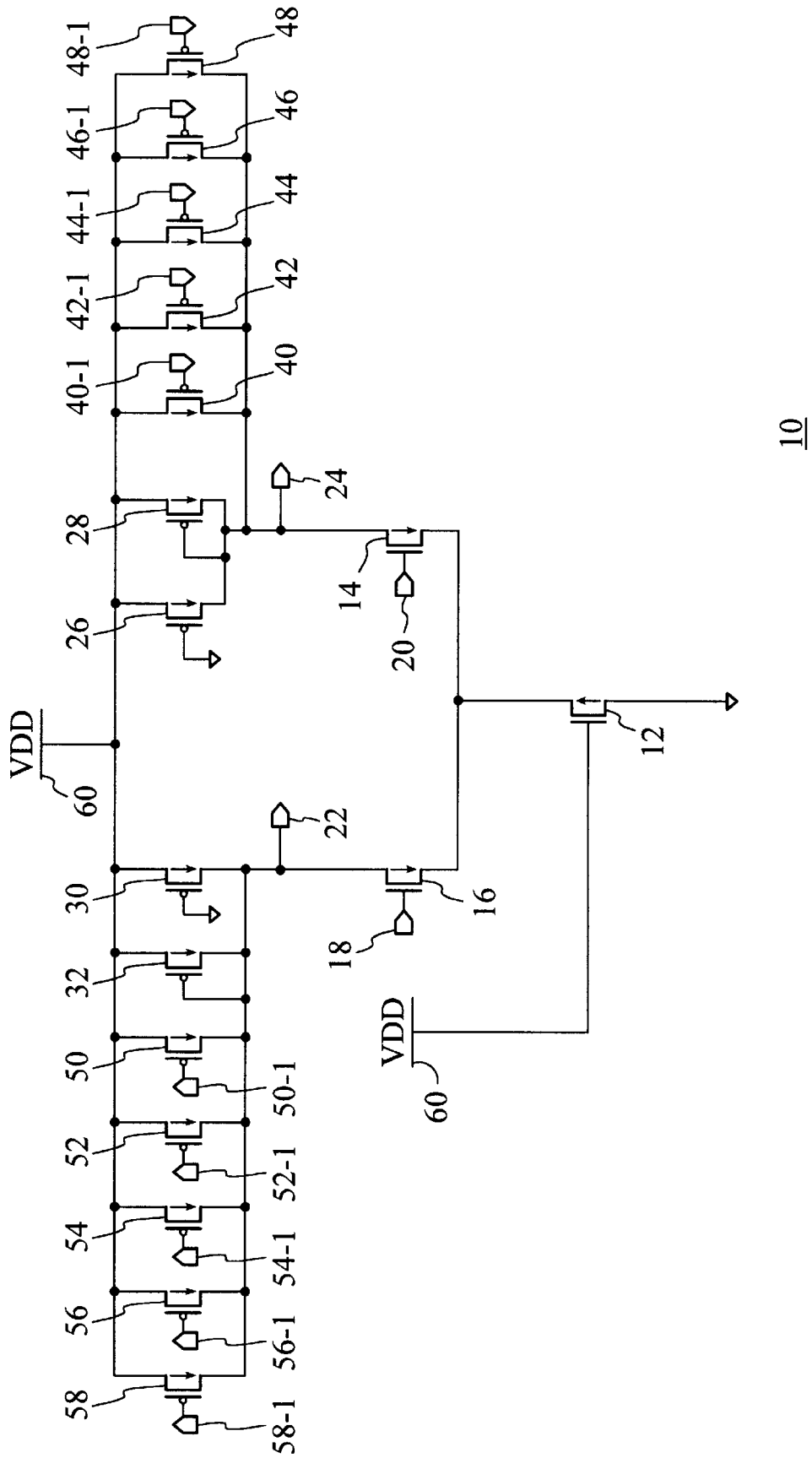
FIG. 2 is a block diagram of one embodiment of a receiver in accordance with the method and system.

To more particularly illustrate the method and system in accordance with the present invention, refer now to FIG. 2 depicting a block diagram of one embodiment of a receiver 10 in accordance with the method and system. The receiver 10 receives the differential signal through inputs in 18 and inb 20 coupled with devices 16 and 14 respectively. In one embodiment, in 18 receives a first sine wave and inb 20 receives a sine wave offset by 180 degrees from the first sine wave. In a preferred embodiment, the signal received by in 18 and inb 20 is provided by a SAW. A resultant differential signal is output from the receiver at out 24 and nout 22.

In a preferred embodiment, the SAW signal has a frequency of 800 MHz and a rise time of 625 picoseconds. In the preferred embodiment, the root mean square jitter of the signal is 2.5 picoseconds. Note that for a similar signal, a conventional PLL would have a much higher jitter. Consequently, a lower noise signal is provided by the receiver 10 in conjunction with the SAW signal discussed above.

The device 12 coupled to the reference voltage 60 provides a current source. In a preferred embodiment, the device 12 is an NFET. The devices 26, 28, 30 and 32 provide a load on the current source. The device pairs comprised of devices 30 and 32 and devices 26 and 28 control edge transitions of the output signal. The operation of devices 30 and 32, and devices 26 and 28 will be discussed below. In one embodiment, devices 26, 28, 30 and 32 are PFET transistors. The devices 40, 42, 44, 46 and 48 and 50, 52, 54, 56 and 58 also provide a load. The additional load devices 40, 42, 44, 46 and 48 and 52, 54, 56 and 58 control the granularity of the transitions. In one embodiment, the devices 40, 42, 44, 46, 48, 50, 52, 54, 56 and 58 are PFET transistors.

Although a total of ten additional load devices 40, 42, 44, 46, 48, 50, 52, 54, 56 and 48 and 50 through 58 are shown, nothing prevents another number of load devices from being used. Depending on the ratios between the additional load devices 40, 42, 44, 46, 48, 50, 52, 54, 56, and 58 and the number of devices provided, the granularity of the signal output at nout 22 and out 24 is changed. The receiver 10 shown in FIG. 2 allows for steps of twenty picoseconds. The biasing at pins 40-1, 42-1, 44-1, 46-1 and 48-1 and 50-1, 52-1, 54-1, 56-1 and 58-1 at the gates for devices 40, 42, 44, 46, 48, 50, 52, 54, 56 and 58 control the correction of duty cycles. The bias at pins 40-1, 42-1, 44-1, 46-1 and 48-1 and 50-1, 52-1, 54-1, 56-1 and 58-1 determines the behaviors of devices 40, 42, 44, 46, 48, 50, 52, 54, 56 and 58, for example, by turning one of the devices 40, 42, 44, 46, 48, 50, 52, 54, 56 and 58 on or off.

The state of devices 40, 42, 44, 46, 48, 50, 52, 54, 56 and 58 adjusts the cross-over point for the signals provided from in 18 and inb 20 to provide output signals through out 24 and nout 22. The devices 50 through 58 control the cross-over for the signal provided by in 18 and output through out 24. The devices 40 through 48 control the cross-over for the signal provided by inb 20 and output through out 24. Because the receiver 10 is symmetric, either positive or negative adjustment of the cross-over can be achieved.

In the receiver 10, the devices 40, 42, 44, 46, 48, 50, 52, 54, 56 and 58 control the signals by changing the impedance. If more current is drawn through the leg of the circuit containing inb 20, the impedance of the devices 50 through 58 changes with respect to the devices 40 through 48. This pulls the current in the leg containing inb 20 downward, thereby adjusting the crossover point of the signal provided by inb 20.

The biasing at pins 40-1, 42-1, 44-1, 46-1, 48-1, 50-1, 52-1, 54-1, 56-1 and 58-1 can be controlled through a variety of means that are not critical to the behavior of the receiver 10 shown in FIG. 2. The control means would adjust the bias on pins 40-1, 42-1, 44-1, 46-1, 48-1, 50-1, 52-1, 54-1, 56-1 and 58-1 depending on whether the signal at in 18 or inb 20 is offset.

In one embodiment, an increment/decrement system biases the pins 40-1, 42-1, 44-1, 46-1, 48-1, 50-1, 52-1, 54-1, 56-1 and 58-1. In another embodiment, the signals provided at nout 22 and out 24 are supplied to a differential integrator with a digital gain that can be either in an increment or decrement mode. The biasing of the pins 40-1 through 58-1 may also be done continuously converging to a fixed jitter equal to the granularity of the additional load devices 40 through 58.

In addition, an analog to digital converter ("ADC") could be used to control the pins 40-1, 42-1, 44-1, 46-1 and 48-1 and 50-1, 52-1, 54-1, 56-1 and 58-1. In such a system, a fixed reference is used to determine how far off the signal received at inputs in 18 and inb 20 from the reference voltage. This relative scale is quantized by the ADC, fed through control logic, and the bias of the pins 40-1, 42-1, 44-1, 46-1 and 48-1 and 50-1, 52-1, 54-1, 56-1 and 58-1 adjusted. This allows for faster settling time of the receiver 10.

However, if an ADC is used to control the bias to the pins 40-1, 42-1, 44-1, 46-1 and 48-1 and 50-1, 52-1, 54-1, 56-1 and 58-1, the additional load devices 40 through 58 must be binary. For example, the load device 58 would have a weight of 0.5. The load device 56 would have weight of one, and the load device 54 would have a weight of two. The remainder of the circuit would be adjusted accordingly. Finally, pins 40-1, 42-1, 44-1, 46-1 and 48-1 and 50-1, 52-1, 54-1, 56-1 and 58-1 could be controlled digitally through scan registers. The resultant bias might then be locked in place.

The load devices 26, 28, 30 and 32 provide fast edge rates at out 24 and nout 22. The devices 26 and 30 are precharged to rapidly drive out 24 and nout 22, respectively. The devices 28 and 32 act as clamps for the devices 26 and 30, respectively. In a preferred embodiment, the clamping level for devices 28 and 32 is seventy five percent of the reference voltage 60. Because of this, fast edge rates are provided at out 24 and nout 22 without concern over the loading effects. If the clamps 28 and 32 were not provided, the receiver 10 would require other means to control the devices 26 and 30 so that as the impedance varied, the voltage swings would remain relatively constant.

Removing devices 28 and 32 causes great complications. Firstly, with these devices removed, nodes out 24 and nout 22 would have to be replica biased. Replica biasing would require taking one-half the cell and feeding the output into an operational amplifier to provide an auto-swing circuit. This type of circuit requires analog circuitry which can be cumbersome and complicated.

In the receiver 10, the devices 26 and 32 which are precharged to effect fast edge transition have less precharge than the receiver 10 has pull down current provided by the device 12 and the reference voltage 60 used to control the offsets in the duty cycle. This is because there is some tension between the precharge and pull down current. A typical PFET is approximately two and one-half times weaker than an NFET having the same effective device width. Consequently, a preferred embodiment uses PFETs for devices 26 and 30, and an NFET for device 12. This ensures sufficient pull down current to correct the duty cycles while providing fast edge transitions.

Figure 3:
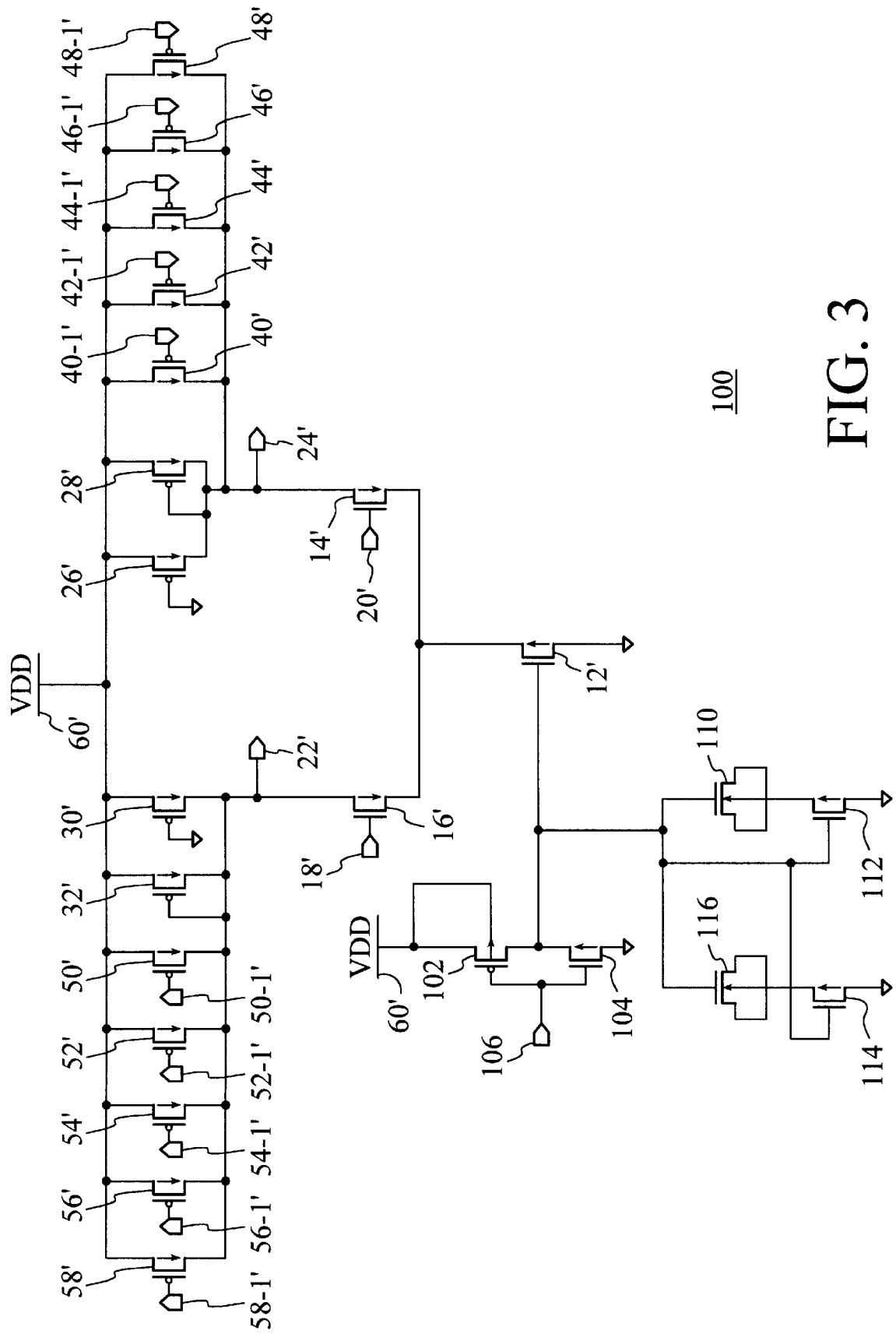
FIG. 3 is a block diagram of a second embodiment of a receiver in accordance with the method and system.

FIG. 3 depicts a receiver 100 having similar functions as the receiver 10 of FIG. 2. Because of this, components of the receiver 100 analogous to components in receiver 10 are labeled similarly. For example, the device 12' and the reference voltage 60' provide a current source in receiver 100 of FIG. 3, just as the device 12 and the reference voltage 60 provide a current source in the receiver 10 of FIG. 1. However, the receiver 100 of FIG. 3 also provides additional features.

The receiver 100 is compatible with ASIC. ASIC has a gate oxide integrity test provided at input iddq 106. Because the receiver 100 has a DC current path, the DC current must be decoupled. The devices 102 and 104 comprise an inverter which can decouple the device 12'. The gate of device 12' can, therefore, be pulled to ground. The devices 26' and 30' will pull then nout 22' and out 24' to the reference voltage. Consequently, no current will flow and the oxide integrity test may be performed. Device 102 is highly resistive, i.e., is longer than the minimum channel length and small to minimum channel width. Device 102 forms the resistance of the RC filter and devices 110 and 116 form the capacitance.

In addition, a high frequency filter is provided in the receiver 100 by devices 110, 112, 114, and 116 to remove high frequency noise. If the voltage at the gate of device 12' varies, a jitter may be introduced. The frequency filter is provided to remove this jitter and is typically designed as a 100 MHz filter.

A preferred embodiment of the receiver 100 utilizes a SAW as a source providing a differential signal to inputs in 18' and inb 20'. In a preferred embodiment, the SAW is used as a source to provide a processor clock. Typically, a SAW provides a signal at a single frequency, plus or minus approximately two hundred parts per million. In an embodiment of the receiver 100 in an older system having both a reference clock and a SAW providing signals, the SAW typically runs at a slightly higher frequency than the reference clock. The signal from the SAW must then be divided down.

In one embodiment having a SAW running at a higher frequency than the reference clock, to maintain the phase, the internal clock is stretched. Thus, in an embodiment of the receiver 100 in a system also having a reference clock, approximately every thousand processor cycles the processor clock is stretched one-quarter of a cycle to maintain phase alignment with reference clock. In order to prevent additional jitter, a change in the granularity provided using devices 40', 44', 46', 48', 50', 52', 54', 56' and through 58' is only allowed when the processor clock is being stretched.

A method and system has been disclosed for providing a high speed differential signal in which corruptions of the duty cycle are corrected.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A high speed differential receiver circuit comprising:
   a source device;
   receiver means coupled to the source device; the receiver means for receiving first and second differential signals at a first input and a second input and providing first and second output signals at a first output and a second output;
   a first plurality of load devices coupled to the first output to control a first voltage swing at the first output; and
   a second plurality of load devices coupled to the second output to control a second voltage swing at the second output.

2. The receiver circuit of claim 1 wherein the first plurality of load devices further comprise:
   a first precharge device; and
   a first clamp device coupled to the first precharge device.

3. The receiver circuit of claim 2 wherein the second plurality of load devices further comprise:
   a second precharge device; and
   a second clamp device coupled to the second precharge device.

4. The receiver circuit of claim 3 wherein the first plurality of devices further comprise a first plurality of additional load devices coupled to the first clamp and the first precharge device, the first plurality of additional load devices for controlling a cross-over of the first output signal.

5. The receiver circuit of claim 4 wherein the second plurality of devices further comprise a second plurality of additional load devices coupled to the second clamp and the second precharge device, the second plurality of additional load devices for controlling a cross-over of the second output signal.

6. The receiver circuit of claim 5 further comprising:
   control means coupled to the first plurality of additional load devices and the second plurality of additional load devices, the control means for controlling the cross-over of the first output signal and the cross-over of the second output signal.

7. The receiver circuit of claim 6 further comprising a filter coupled to the source device, the filter for reducing high frequency noise.

8. The receiver circuit of claim 7 further comprising:
   an inverter coupled to the source device; and
   a test input coupled to the inverter, the test input for providing an oxide integrity test.

9. The receiver circuit of claim 8 wherein the first plurality of load devices further comprise a first plurality PFET transistors.

10. The receiver circuit of claim 9 wherein the second plurality of load devices further comprise a second plurality PFET transistors.

11. The receiver circuit of claim 10 wherein the source device further comprises:
    an NFET; and
    a reference voltage coupled to the NFET.

12. The receiver circuit of claim 11 wherein the first differential signal further comprises a first sine wave having a frequency; and wherein the second differential signal further comprises a second sine wave having the frequency and being one hundred and eighty degrees out of phase with the first sine wave.

13. The receiver circuit of claim 12 wherein the control means further comprise increment/decrement means.

14. The receiver circuit of claim 12 wherein the control means further comprise a differential integrator.

15. The receiver circuit of claim 12 wherein the control means further comprise:
   an analog-to-digital converter; and
   a reference voltage coupled to the analog-to-digital converter.

16. A method for providing a high speed differential receiver circuit comprising the steps of:
   (a) providing a source device;
   (b) providing receiver means coupled to the source device; the receiver means for receiving first and second differential signals at a first input and a second input and providing first and second output signals at a first output and a second output;
   (c) providing a first plurality of load devices coupled to the first output to control a first voltage swing at the first output; and
   (d) providing a second plurality of load devices coupled to the second output to control a second voltage swing at the second output.

17. The method of claim 16 wherein the step of providing the first plurality of load devices further comprises the steps of:
   (c1) providing a first precharge device; and
   (c2) providing a first clamp device coupled to the first precharge device.

18. The method of claim 17 wherein the step of providing the second plurality of load devices further comprises the steps of:
   (d1) providing a second precharge device; and
   (d2) providing a second clamp device coupled to the second precharge device.

19. The method of claim 18 wherein the step of providing the first plurality of devices further comprises the step of:
   (c3) providing a first plurality of additional load devices coupled to the first clamp and the first precharge device, the first plurality of additional load devices for controlling a cross-over of the first output signal.

20. The method of claim 19 wherein the step of providing the second plurality of devices further comprises the step of:
   (d3) providing a second plurality of additional load devices coupled to the second clamp and the second precharge device, the second plurality of additional load devices for controlling a cross-over of the second output signal.

21. The method of claim 20 further comprising the step of:
   (e) providing control means coupled to the first plurality of additional load devices and the second plurality of additional load devices, the control means for controlling the cross-over of the first output signal and the cross-over of the second output signal.

22. The method of claim 21 further comprising the step of:
   (f) providing a filter coupled to the source device, the filter for reducing high frequency noise.

23. The method of claim 22 further comprising the steps of:
   (g) providing an inverter coupled to the source device; and (h) providing a test input coupled to the inverter, the test input for providing an oxide integrity test.

24. The method of claim 23 wherein the first plurality of load devices further comprise a first plurality PFET transistors.

25. The method of claim 24 wherein the second plurality of load devices further comprise a second plurality PFET transistors.

26. The method of claim 25 wherein the step of providing the source device further comprises the steps of:
   (a1) providing an NFET; and
   (a2) providing a reference voltage coupled to the NFET.

27. The method of claim 25 wherein the first differential signal further comprises a first sine wave having a frequency; and
   wherein the second differential signal further comprises a second sine wave having the frequency and being one hundred and eighty degrees out of phase with the first sine wave.

28. The method of claim 27 wherein the step of providing the control means further comprises the step of:
   (e1) providing increment/decrement means.

29. The method of claim 28 wherein the step of providing the control means further comprises the step of:
   (e1) providing a differential integrator.

30. The method of claim 29 wherein the step of providing the control means further comprises the step of:
   (e1) providing an analog-to-digital converter; and
   (e2) providing a reference voltage coupled to the analog-to-digital converter.

31. The high speed differential receiver circuit of claim 12 wherein the first differential signal and the second differential signal are further provided by a SAW.

32. A circuit for adjusting a cross-over of a first input signal and a second input signal comprising:
   a source device;
   a receiver coupled to the source device for receiving the first input signal and a second input signal;
   a first output coupled to the receiver for providing a first output signal;
   a second output coupled to the receiver for providing a second output signal;
   a first plurality of load devices coupled to the first receiver and the first output for controlling a first voltage swing at the first output; and
   a second plurality of load devices coupled to the second receiver and the second output for controlling a second voltage swing at the second output.

33. A method for controlling the duty cycle of a first signal received at a first input and a second signal received at a second input comprising the steps of:
   (a) providing a current from a current source coupled with the first input and with the second input;
   (b) driving a first plurality of load devices and a second plurality of load devices using the current;
   (c) adjusting a first impedance of the first plurality of load devices to adjust a cross-over of the first signal and provide a first adjusted signal; and
   (d) adjusting a second impedance of the second plurality of load devices to adjust a cross-over of the second signal and provide a second adjusted signal;
   wherein a duty cycle of the first adjusted signal and the second adjusted signal is substantially a desired duty cycle of the first signal and the second signal.

34. The method of claim 33 further comprising the steps of:

(e) controlling a first edge rate of the first adjusted signal and a second edge rate of the second adjusted signal.

35. The method of claim 34 wherein the first input signal includes a first sine wave having an amplitude and first phase and the second input signal includes a second sine wave having the amplitude and a second phase which is one hundred and eighty degrees out of phase with the first phase.

36. The method of claim 35 wherein the step of controlling the first impedance (c) further includes the step of:

(c1) controlling a first bias at each of the first plurality of load devices.

37. The method of claim 36 wherein the step of controlling the second impedance (d) further includes the step of:

(d1) controlling a second bias at each of the second plurality of load devices.

* * * * *